United States Patent Office 3,413,293
Patented Nov. 26, 1968

3,413,293
METHOD FOR PRODUCING 2,3,4,6,7,12-HEXA-HYDROINDOLO-[2,3-a] QUINOLIZINE
Robert Norman Schut, Edwardsburg, Mich., assignor to Miles Laboratories, Inc., Elkhart, Ind., a corporation of Indiana
No Drawing. Filed Feb. 14, 1966, Ser. No. 527,070
1 Claim. (Cl. 260—296)

This invention relates to the synthesis of 2,3,4,6,7,12-hexahydroindolo-[2,3-a]quinolizine. In some of its more particular aspects this invention relates to a novel synthetic scheme for producing this compound and to the novel intermediates prepared in the synthesis.

2,3,4,6,7,12-hexahydroindolo-[2,3-a]quinolizine, an indole enamine, is useful as an intermediate in the synthesis of indole alkaloids having the structural features of the eburnamine-vincamine alkaloids.

Previous methods for the synthesis of these compounds have suffered from the low yields obtainable by these methods, E. Wenkert and B. Wickberg, J. Am. Chem. Soc., 84, 4914–4919 (1962), G. C. Morrison, W. Cetenko and J. Shavel, Jr., J. Org. Chem., 29, 2771–2772 (1964).

It is accordingly a principal object of this invention to provide a process for the preparation of 2,3,4,6,7,12-hexahydroindolo-[2,3-a]quinolizines in high yields.

Another object of this invention is to provide a synthetic scheme which is convenient and adaptable to commercial preparation of the desired quinolizines.

Other objects and advantages of this invention will become apparent in the course of the following detailed disclosure and description.

The synthesis which provides the basis for the process of this invention can be illustrated by means of the following series of equations in which, for the sake of convenience, specific reagents have been indicated.

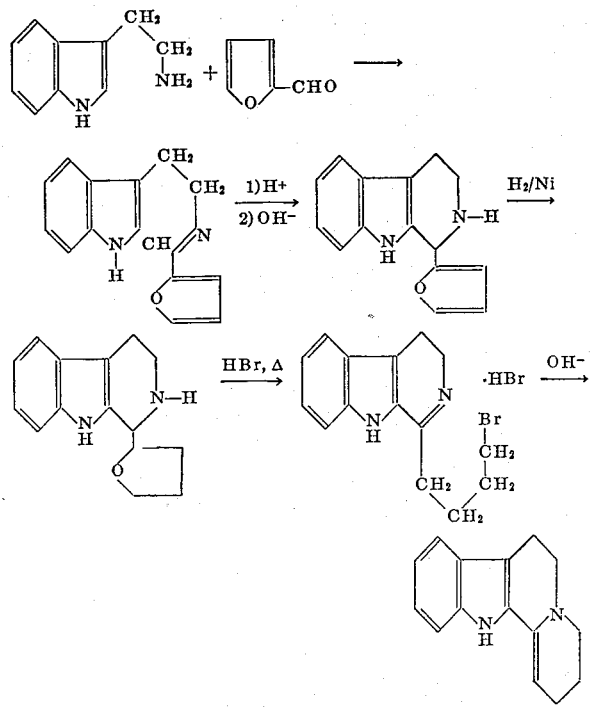

As can be seen from the above sequence, the process generally comprises reacting tryptamine and furfural to form N-(2-furfurylidene)tryptamine, reacting the latter compound with an acid followed by neutralization with a base to form 1-(2'-furyl)-1,2,3,4-tetrahydro-β-carboline, hydrogenating the latter compound to form 1-(2'-tetrahydrofuryl)-1,2,3,4-tetrahydro-β-carboline, treating the latter compound with an acid such as hydrogen bromide to cleave the tetrahydrofuran ring to form, for example, 1-(4'-bromobutyl)-3,4-dihydro-β-carboline and treating the latter compound with aqueous base to close the ring to form 2,3,4,6,7,12-hexahydroindolo-[2,3-a]quinolizine.

More specifically the first step of the above detailed sequence consists in the condensation of tryptamine with furfural which can be conveniently carried out by heating the reagents under reflux in a suitable solvent such as benzene. Other inert solvents can be used if desired.

The product of this reaction, N-(2-furfurylidene)tryptamine, a Schiff base, is a known compound and can be isolated as a crystalline solid.

Upon treatment with a strong acid such as hydrochloric acid the Schiff base undergoes a Pictet-Spengler type ring closure yielding, for example, a crystalline hydrochloride and upon subsequent treatment with base 1-(2'-furyl)-1,2,3,4-tetrahydro-β-carboline, a novel intermediate, can be isolated as a crystalline solid. In order to achieve the ring closure any strong acid may be used, such as sulfuric acid, phosphoric acid or the like. Since it is desired to have the product of the ring closure present in the free base form for the third step of the synthesis, the ring closure product can be neutralized with any convenient base such as an aqueous hydroxide and the like.

In order to synthesize 1-(2'-tetrahydrofuryl)-1,2,3,4-tetrahydro-β-carboline, another novel intermediate, hydrogenation under relatively low pressure is resorted to. An active nickel catalyst such as Raney nickel or a zirconium promoted nickel catalyst can be used for this purpose. Ruthenium dioxide serves equally well as catalyst for reduction of the furan ring. Platinum and palladium catalysts can also be used if desired, but in general are too sluggish to give desirable results. 1-(2'-tetrahydrofuryl)-1,2,3,4-tetrahydro-β-carboline is most conveniently isolated in the form of a crystalline salt prepared by treatment of the free base with an acid such as hydrobromic acid or hydrochloric acid.

The fourth step in the sequence is the opening of the tetrahydrofuran ring which can be conveniently accomplished by treatment with a hydrogen halide such as hydrogen bromide. The product, 1-(4-bromobutyl)-3,4-dihydro-β-carboline, a novel intermediate, can be isolated as a solid in the form of various salts such as the hydrochloride, hydrobromide and hydroiodide.

The final step in the sequence involves another ring closure in which the above described 1-(4-bromobutyl)-3,4-dihydro-β-carboline hydrobromide is treated with an aqueous base such as sodium hydroxide, potassium hydroxide or sodium carbonate to eliminate HBr and effect the ring closure.

This invention will be better understood with reference to the following examples. The examples furnished, however, are not intended to limit the scope of the invention which is defined in the claims appended hereto.

Example 1

N-(2-furfurylidene)tryptamine.—A mixture of 409 g. (2.55 moles) of tryptamine and 261 g. (2.72 moles) of freshly distilled furfural in 2 l. of benzene was heated under reflux for 4 hours. The water liberated was collected in a Dean-Starke trap. The crystalline material which precipitated on cooling was collected, washed with benzene and dried; yield 534 g. (88%); M.P. 136–137°. The infrared spectrum (CHCl$_3$) showed a strong band at 1650 cm.$^{-1}$ (–N=C<). The analytical sample was prepared by recrystallization from benzene-hexane; M.P. 136–136.5°.

*Analysis.*—Calcd. for C$_{15}$H$_{14}$N$_2$O: C, 75.63; H, 5.92; N, 11.76. Found: C, 75.57; H, 6.10; N, 11.85.

Example 2

1-(2'-furyl)-1,2,3,4-tetrahydro-β-carboline.—A 265 g. sample (1.11 moles) of N-(2-furfurylidene)tryptamine was added slowly to a stirred solution of 95 g. of hydrogen chloride in 1.5 l. of tetrahydrofuran. The temperature was kept below 10° during the addition. The solution was stirred at room temperature for 2 hours during which time 1-(2'-furyl)-1,2,3,4-tetrahydro-β-carboline hydrochloride crystallized. The salt was collected and washed with tetrahydrofuran. The compound does not melt below 300°. The hydrochloride was dissolved in 3 l. of cold water and the resulting solution was stirred vigorously at 10° while sodium hydroxide solution was added. The precipitated free base was collected and washed with water; yield, 247 g. (93%); M.P. 132–133°;

$\nu_{max.}^{CHCl_3}$ 1020 (ether) and 890 (furan) cm.$^{-1}$ 1020 (ether) and 890 (furan) cm.$^{-1}$ An analytical sample was prepared by recrystallization from ether-pentane; M.P. 134–135°. A mixed melting point with N-(2-furfurylidene)tryptamine was depressed to 105–110°.

*Analysis.*—Calcd. for $C_{15}H_{14}N_2O$: C, 75.63; H, 5.92; N, 11.76. Found: C, 75.58; H, 6.10; N, 11.80.

Example 3

1-(2'-tetrahydrofuryl)-1,2,3,4-tetrahydro-β-carboline hydrobromide.—A 292 g. sample (1.22 moles) 1-(2'-furyl)-1,2,3,4-tetrahydro-β-carboline was dissolved in 1 l. of methanol and hydrogenated at 1500 p.s.i. and 100° using 5 g. of Girdler (G–69, zirconium promoted) nickel catalyst. After the reduction was completed (ca. 1 hour) the catalyst was removed and the solvent concentrated in vacuo. The residual oil was dissolved in 2-propanol and a hydrogen bromide-2-propanol solution was added. The salt was collected, washed with 2-propanol and ethyl acetate and dried; yield 380 g. (96%), M.P. 262–263° (dec.). For analysis, a sample was recrystallized from aqueous isopropyl alcohol; M.P. 267–268° (dec.).

*Analysis.*—Calcd. for $C_{15}H_{18}N_2O \cdot HBr$: C, 55.73; H, 5.94; N, 8.67. Found: C, 55.59; H, 6.10; N, 8.77.

Example 4

1-(4-bromobutyl)-3, 4-dihydro-β-carboline hydrobromide.—A 345 g. sample (1.07 moles) of 1-(2'-tetrahydrofuryl)-1,2,3,4-tetrahydro-β-carboline hydrobromide was dissolved in 3.5 l. of 48% hydrobromic acid. The solution was stirred and heated on the steam bath while hydrogen bromide was bubbled into the solution over a 3-hour period. The solution was heated an additional 30 minutes, then allowed to cool. The yellow crystalline product which formed was collected, washed with acetic acid and water and dried; yield 368 g. (93%), M.P. 211–213°;

$\nu_{max}^{KCl}$ 1635, 1575 and 1560 cm.$^{-1}$

The analytical sample was obtained by recrystallization from methanol-ether; M.P. 209–210°.

*Analysis.*—Calcd. for $C_{15}H_{17}BrN_2 \cdot HBr$: C, 46.63; H, 4.66; N, 7.25; Br$^-$, 20.70. Found: C, 46.97; H, 4.88; N, 7.25; Br$^-$, 21.09.

Example 5

2,3,4,6,7,12-hexahydroindolo-[2,3-a]quinolizine.—To a solution of 368 g. of 1-(4-bromobutyl)-3,4-dihydro-β-carboline hydrobromide in 4 l. of methanol and 2 l. of water at 50° was added a solution of 150 g. of potassium hydroxide in 1 l. of water. A light tan solid formed immediately. The product was collected and washed thoroughly with water; yield 210 g. (95%), M.P. 161–164°. After recrystallization of a sample from pentane-ether the melting point range widened to 159–167°. Infrared spectrum (CHCl$_3$): bands at 3480 (indole N—H) and 1660 cm.$^{-1}$ $(>C=C-N<)$.

Ultraviolet spectrum:

$\lambda_{max.}^{CH_2Cl_2}$ 242 (ε 19,200), 307 (ε 17,700), sh. 313–317 mμ (ε 17,300)

NMR (10% CDCl$_3$): τ 2.05 (N—H, indole), 2.4–3.0 (4H, aromatic), 5.08 (1H, olefinic), 6.7–7.2 (6H, CH$_2$—N—CH$_2$+indole—CH$_2$—CH$_2$—)

7.6–8.2 (4H, —CH$_2$CH$_2$—)

*Analysis.*—Calcd. for $C_{15}H_{16}N_2$: C, 80.36; H, 7.14; N, 12.50. Found: C, 80.03; H, 7.16; N, 12.45.

As shown above all intermediate compounds in the synthesis have been isolated and characterized. However, if the synthesis is carried out without purification of intermediates the product can be obtained in a 70% overall yield, based on tryptamine as starting material. This represents a considerable improvement over the yields reported for other procedures.

In summary this invention provides a process for the synthesis of 2,3,4,6,7,12-hexahydroindolo-[2,3-a]-quinolizine in high yields and novel intermediates prepared in the synthesis thereof.

What is claimed is:

1. A process for the preparation of 2,3,4,6,7,12-hexahydroindolo-[2,3-a]quinolizine which comprises reacting tryptamine and furfural to form N-(2-furfurylidene)tryptamine, reacting the latter compound with a strong acid followed by neutralization with a base to form 1-(2'-furyl)-1,2,3,4-tetrahydro-β-carboline, hydrogenating the latter compound to form 1-(2'-tetrahydrofuryl)-1,2,3,4-tetrahydro-β-carboline, cleaving the tetrahydrofuran ring with hydrogen bromide to form 1-(4-boromobutyl)-1,2,3,4-tetrahydro-β-carboline hydrobromide and treating the latter compound with an aqueous base to form 2,3,4,6,7,12-hexadyroindolo-[2,3-a]quinolizine.

References Cited

UNITED STATES PATENTS 3,018,286   1/1962   Velluz et al. _____ 260—296
3,087,930   4/1963   Schut _____ 260—296

OTHER REFERENCES

Morrison et al., J. Org. Chem., vol. 29, No. 9, pp. 2771–2 (1964).

HENRY R. JILES, *Primary Examiner.*

A. ROTMAN, *Assistant Examiner.*